United States Patent
Tsujimoto (10) Patent No.: US 8,115,958 B2
(45) Date of Patent: Feb. 14, 2012

(54) IMAGE FORMING APPARATUS

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 845 days.

(21) Appl. No.: 12/219,399

(22) Filed: Jul. 22, 2008

(65) Prior Publication Data

US 2009/0027722 A1    Jan. 29, 2009

(30) Foreign Application Priority Data

Jul. 24, 2007    (JP) ................................. 2007-192228

(51) Int. Cl.
*G06F 3/12*    (2006.01)
*G06F 1/00*    (2006.01)

(52) U.S. Cl. ...................................... 358/1.15; 713/300

(58) Field of Classification Search ................... 713/300, 713/320, 323; 358/1.14, 421, 1.15, 468, 358/471
See application file for complete search history.

(56) References Cited

U.S. PATENT DOCUMENTS

| | | | | |
|---|---|---|---|---|
| 7,406,611 B2 * | 7/2008 | Takahashi et al. | ............ | 713/300 |
| 2007/0223030 A1 | 9/2007 | Miyajima | | |

FOREIGN PATENT DOCUMENTS

| | | |
|---|---|---|
| JP | 2004-018821 | 1/2004 |
| JP | 2005-065200 | 3/2005 |
| JP | 2005-202813 | 7/2005 |
| JP | 2006-260235 | 9/2006 |
| JP | 2007-065577 | 3/2007 |
| JP | 2007-105937 | 4/2007 |
| JP | 2007-266698 | 10/2007 |

* cited by examiner

*Primary Examiner* — Jerome Grant, II (74) *Attorney, Agent, or Firm* — David G. Conlin; Steven M. Jensen; Edwards Wildman Palmer LLP (57) ABSTRACT

In an image forming apparatus to which a user can login, a management unit that manages login information of a user, a storage unit that stores print data of a print job received from an external device, and a control unit are provided. When a print job is introduced from the external device while the control unit recognizes a state of a user being logged in the login management unit, the control unit temporarily stores the print data of the print job received from the external device in the storage unit and then when the control unit detects a logout with the termination of the login state in the login management unit, starts printing of the print job that is received from the external device and stored in the storage unit.

15 Claims, 7 Drawing Sheets

Prior Art

1

IMAGE FORMING APPARATUS

This application claims priority under 35 U.S.C. §119(a) on Japanese Patent Application No. 2007-192228 filed in Japan on Jul. 24, 2007, the entire contents of which are herein incorporated by reference.

BACKGROUND OF THE INVENTION

Field of the Invention

The present invention relates to an image forming apparatus such as a digital copier, printer, facsimile, digital multifunction machine (MFP) or the like that communicates with external devices and to which a user can login.

In conventional image forming apparatuses of this type, a print job is sometimes introduced from a communicatively connected external device while a user is logged in. For example, when an image of an original of the logged-in user is read as print data and printing is performed based on the read print data, a print job may be introduced from a communicatively connected external device. Moreover, when printing is performed based on the print data of a user who is logged in to one external device among communicatively connected external devices, a print job may be introduced from another external device.

In such a conventional image forming apparatus, when user A in a login state is executing a print job (for example, during the copy operation of a digital multifunction machine (MFP)), if a print job of another user B is introduced from a communicatively connected external device (for example, a print job from a computer (PC)), the print job of user B is executed after the completion of printing according to the print job of user A while the user A is in the state of being logged in. Then, if user A introduces print jobs a plurality of times thereafter, the print created according to the print job of user B is mixed in the prints according to the print jobs of user A.

Figure 7:
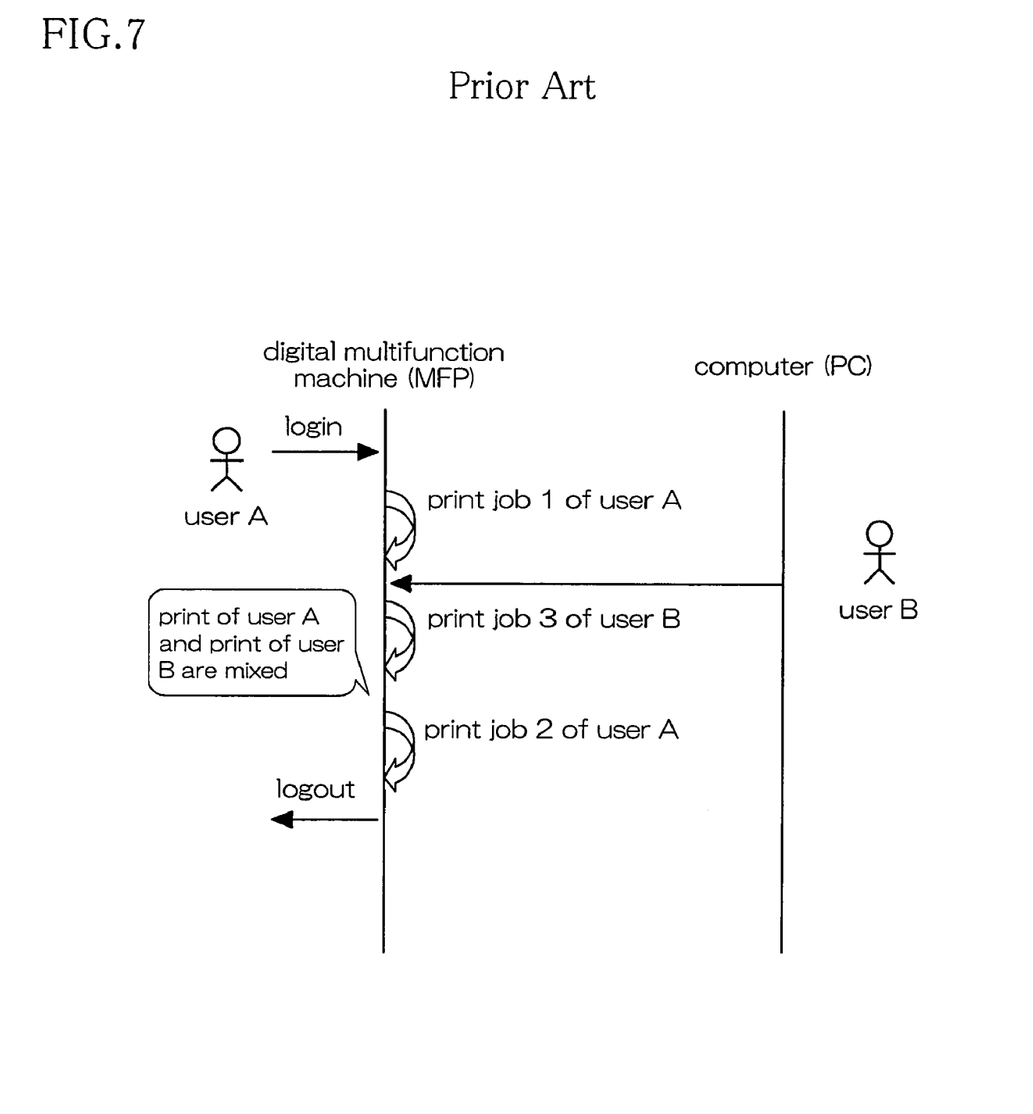
FIG. 7 is an explanatory drawing showing a problem of when a user is logged in to a conventional image forming apparatus and a print job of another user is introduced from an external device.

This shall be described in more details with reference to FIG. 7. FIG. 7 is an explanatory drawing showing a problem of when a print job of user B is introduced from an external device while user A is logged in to a conventional image forming apparatus. In the description given below, a digital multifunction machine and a computer are used as examples of the image forming apparatus and the external device, respectively.

As shown in FIG. 7, in a digital multifunction machine, first, a login operation is given by user A. Then, a copy operation for print job 1 of user A is started. After the end of copying print job 1 by user A, while user A is preparing for the next copy operation, the print job of print job 3 of user B is introduced from an external computer. Then, the digital multifunction machine starts executing the print job of print job 3 of user B despite user A still being logged in. On a discharge tray, the print created according to print job 3 of user B is placed over the print created according to copy job 1 of user A. Then, the copy operation for the following print job 2 by user A is executed. After the completion of the copy operation for print job 2, the print created according to copy job 2 of user A is placed over the print created according to print job 3 of user B that has been discharged earlier. Then, an operation to logout of the digital multifunction machine is performed by user A. In this way, as a result, the print by print job 3 of user B is sandwiched between the prints by copy jobs 1 and 2 of user A, and the prints by these jobs are in a mixed state while user A is logged in, thereby making a problem of requiring a time and effort in subsequent sorting work that is performed manually.

Moreover, the above-described phenomenon similarly occurs when a print job is introduced from an external device while printing is executed based on the print data of a user that is logged in to another external device. For example, JP 2004-188821A discloses that when print jobs are introduced into one printer from a plurality of computers, printing is performed first for a computer that has completed data opening. That is, when a plurality of computers are connected to one printer and when printing is requested from a plurality of computers simultaneously, the printer performs printing of all print data regardless of whether a user is in the state of being logged in.

SUMMARY OF THE INVENTION

The present invention was conceived in light of these circumstances, and it is an object of the present invention to provide an image forming apparatus that, when executing a print job while a user is in a state of being logged in, even if a print job of another user is introduced, can prevent prints created according to these print jobs from being mixed while the user is in the state of being logged in, and thereby can eliminate the time and effort of sorting work that is performed manually.

The image forming apparatus of the present invention is an image forming apparatus to which a user can login; the image forming apparatus has a communication function to communicate with an external device and an image recording function to perform printing based on print data and the image forming apparatus is provided with a login management unit that manages login information of a user, a storage unit that stores the print data of a print job received from the external device and a control unit; and when a print job is introduced from the external device while the control unit recognizes a state of a user being logged in in the login management unit, the control unit temporarily stores the print data of the print job received from the external device in the storage unit and then when the control unit detects a logout with termination of the login state in the login management unit, the control unit starts printing of the print job received from the external device stored in the storage unit.

According to the image forming apparatus of the present invention, the control unit temporarily stores the print data of the print job received from the external device in the storage unit when the print job is introduced from the external device while the control unit recognizes the login state and then when the control unit detects a logout with the termination of the login state, the control unit starts printing of the print job that is received from the external device and stored in the storage unit. Therefore, when a print job is executed while the first user is in a state of being logged in, even if a print job of the second user is introduced, mixing of prints created according to these print jobs can be prevented while the first user is still in a state of being logged in, so it is possible to eliminate the time and effort of sorting work that is performed manually.

The image forming apparatus according to the present invention may have an image reading function to read an image of an original as print data. The image recording function performs printing based on print data of print jobs from the image reading function and the external device, and when a print job is introduced from the external device while the control unit recognizes a state of a user being logged in to the image forming apparatus in the login management unit, the control unit may temporarily store the print data of the print job received from the external device in the storage unit and then when the control unit detects a logout with termination of the state of the user being logged in to the image forming apparatus in the login management unit, the control unit may start printing of the print job received from the external device stored in the storage unit.

In the image forming apparatus of according to the present invention, the storage unit may be a storage device built in the image forming apparatus or an external storage device that is connected to the exterior of the image forming apparatus. In this configuration, it is possible to use both a storage device built in the image forming apparatus and the external storage device. Examples of the storage device built in the image forming apparatus include semiconductor memories and magnetic storage devices (in particular, hard disk drive units (HDDs)), and examples of the external storage device include USB (Universal Serial Bus) memories and storage units of communicatively connected computers (in particular, personal computers (PCs)).

In the image forming apparatus according to the present invention, authentication information of a user can be registered in the login management unit, and management of login information of the user by the login management unit may be realized by an authentication function using the registered authentication information of the user.

In the image forming apparatus according to the present invention, a coin-operated vending machine may be connected thereto. The user login and logout processing in the login management unit may respectively be cash-in and cash-out processing by the coin-operated vending machine.

Moreover, in the image forming apparatus according to the present invention, the control unit may be configured such that a time from the detection of the logout with the termination of the login state in the login management unit until the start of printing of the print job received from the external device stored in the storage unit can be set.

Moreover, in the image forming apparatus according to the present invention, the control unit may include an informing means that informs the external device that the print job of the external device is suspended when the print data of the print job received form the external device is stored in the storage unit while the login state in the login management unit is recognized.

Moreover, the image forming apparatus according to the present invention may be further provided with a plurality of discharge trays. After detecting the logout with the termination of the login state in the login management unit, the control unit may use a discharge tray that is a destination discharge tray for a print printed according to the print job received from the external device and stored in the storage unit and that is different from a discharge tray used during the login state Moreover, the image forming apparatus according to the present invention may be further provided with a plurality of discharge trays. After detecting the logout with the termination of the login state in the login management unit, when the print data received from the external device and stored in the storage unit is of a plurality of print jobs, the control unit may use different discharge trays for each job as destination discharge trays on which prints printed according to the plurality of print jobs are discharged

BRIEF DESCRIPTION OF THE DRAWINGS

FIG. 1 is a block diagram showing an outline of the configuration of the image forming apparatus according to one embodiment of the present invention that is connected to external devices via communication connection means such as a network and the like.

DESCRIPTION OF THE PREFERRED EMBODIMENTS

Hereinafter, embodiments of the present invention are described with reference to the attached drawings. Each of the embodiments given below is an example of the present invention and is not of a nature of limiting the technical scope of the present invention.

Figure 1:
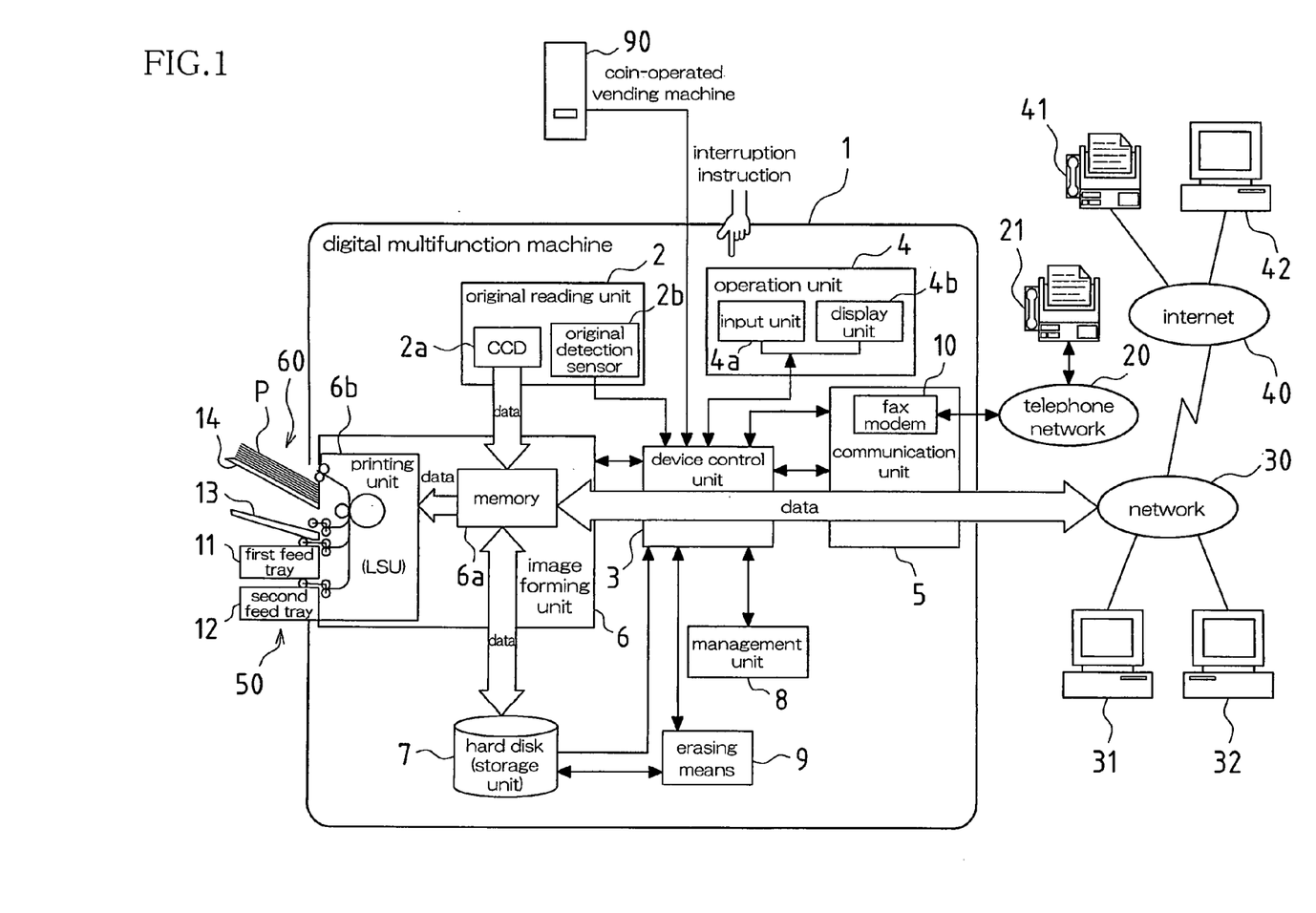

FIG. 1 is a block diagram showing an outline of the configuration of an image forming apparatus according to one embodiment of the present invention that is connected to external devices via communication connection means such as a network and the like. Below, a description is given using a digital multifunction machine as an example of an image forming apparatus 1 according to an embodiment of the present invention.

[Overall Configuration of Digital Multifunction Machine]

The digital multifunction machine 1 according to the embodiment of the present invention is a machine to which a user can login, and the machine has a user management function that manages users who are logged in, an image reading function that reads an image of an original as print data (hereinafter referred to as image data), a communication function that performs communication with one or a plurality of external devices, and an image recording function that performs printing based on the image data obtained by the image reading function and performs printing based on the image data of each print job from the one or a plurality of external devices (for example, an image recording function that forms images according to the electrophotographic image forming process). The digital multifunction machine 1 here has a copier function, a printer function, a scanner function and a facsimile function.

In detail, as shown in FIG. 1, the digital multifunction machine 1 is equipped with an original reading unit 2 that reads an original as image data and inputs the read image data into an image forming unit 6, a device control unit 3 (an example of the control unit) that controls the entire digital multifunction machine 1, an operation unit 4 that receives information input through the input operation of a user, a communication unit 5 that communicates with one or a plurality of external devices via communication connection means using wired and/or wireless connections, the image forming unit 6 that performs data processing on the image data and performs print processing based on the processed image data, a storage unit 7 (for example, a hard disk drive unit (HDD)) for storing the image data of a print job received from at least one of the one or a plurality of external devices, and a management unit 8 (an example of the login management unit) that manages the login information of a plurality of users.

Any device that can introduce the image data of an executed print job into the digital multifunction machine 1 in order to print with the digital multifunction machine 1 can be used as the external device and examples include terminals such as personal computers, facsimiles, digital copiers, scanners, digital multifunction machines, etc., or the external device may be an image forming apparatus according to of the embodiment of the present invention, such as the digital multifunction machine 1 shown in FIG. 1.

The digital multifunction machine 1 shown in FIG. 1 is configured to be able, from the communication unit 5, to send and receive information between the digital multifunction machine 1 and the external devices such as terminals 31, 32 and 42, facsimiles 21 and 41 and the like via a telephone network 20, a local area network 30 such as a wired LAN (local area network), a wireless LAN or the like, an internet 40, and like communication connection means. Due to such a connection, print jobs received from the external devices can be introduced into the digital multifunction machine 1 when the digital multifunction machine 1 is printing the image data read by the original reading unit 2. The communication unit 5 may be connected to the external devices such as terminals via communication connection means such as interfaces defined by IEEE 1394 and the like.

In detail, the original reading unit 2 is provided with an imaging device (for example, a CCD (charge coupled device) 2a that converts light reflected from an original into an electrical signal as image data and an original detection sensor 2b that detects whether or not an original placed on an unshown platen, auto document feeder (ADF) or the like. The original reading unit 2 having such a configuration is adapted such that an image of an original placed on the platen or an original transported one sheet at a time by the auto document feeder is read by the imaging device 2a as image data, and the read image data is input into a memory 6a of the image forming unit 6.

The device control unit 3 controls the operation of the copier function, the scanner function, the facsimile function, the printer function and like functions provided for the digital multifunction machine 1 and also manages the information input from the operation unit 4. The device control unit 3 is composed of a CPU (central processing unit), a ROM (read only memory), a RAM (random access memory), etc. The device control unit 3 is configured to cause each function to operate, manage the status of operation of each function, and display information about the status of operation of each function on a display unit 4b of the operation unit 4 according to the information input from the operation unit 4. Such a function allows a user of the digital multifunction machine 1 to be precisely notified of information that should be given to the user.

Figure 2:
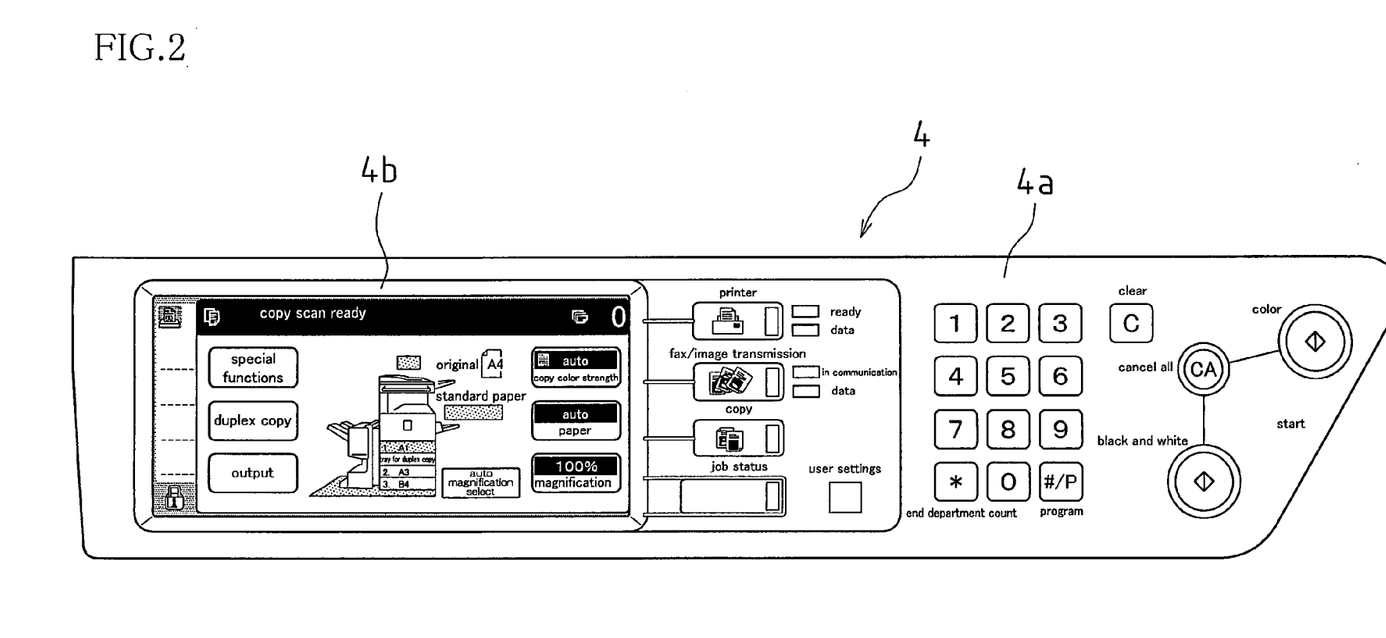
FIG. 2 is a plan view showing the operation unit of the digital multifunction machine shown in FIG. 1.

FIG. 2 is a plan view showing the operation unit 4 of the digital multifunction machine 1 shown in FIG. 1. The operation unit 4 as shown in FIG. 2 is provided with the input unit 4a composed of various mechanical keys, a touch panel and the like and the display part 4b formed by an LCD (liquid crystal display) or the like. The operation unit 4 is configured such that a variety of setup information for the entire apparatus and information for operating each function are input through the input unit 4a, and the input information and the status of the entire operation of the apparatus are displayed on the display unit 4b. Here, the display unit 4b is a touch panel and is configured such that an input operation can be performed thereon. Moreover, an interrupt key that gives an instruction to abort a print job that is being executed and interject another print job may be provided in the operation unit 4.

Here, as shown in FIG. 1, the communication unit 5 is configured such that it can be communicatively connected to the network 30. The terminals 31 and 32 such as personal computers or the like are communicatively connected to the network 30. Moreover, the network 30 is communicatively connected to the internet 40. The terminal 42 such as a personal computer or the like, the internet facsimile 41, etc. are communicatively connected to the internet 40. In addition, the communication unit 5 is equipped with a FAX modem 10. The communication unit 5 is configured such that it can be communicatively connected to the telephone network 20 via the FAX modem 10. The facsimile 21 is communicatively connected to the telephone network 20. The FAX modem 10 sends and receives information, such as image data, between the FAX modem 10 and the facsimile 21 via the telephone network 20. Thereby, the digital multifunction machine 1 is capable of communicating information, such as image data, between the digital multifunction machine 1 and the facsimile 21 as well as the terminals 31 and 32, the internet facsimile 41 and the terminal 42 via the telephone network 20, the network 30 and the internet 40.

The image forming unit 6 is an output means that processes image data and prints the image data on a recording material. Specifically, the image forming unit 6 is provided with a memory 6a that stores image data and a printing unit 6b composed of an LSU (laser scanning unit) that writes an electrostatic latent image based on image data to an image carrier (for example, a photosensitive body) by laser light. The image forming unit 6 is configured such that the image forming unit 6 temporarily stores image data of print jobs received from the original reading unit 2 and the external devices such as the terminals 31, 32 and 42, facsimiles 21 and 41, and the like in the storage unit 7 via the memory 6a, transfers the image data stored in the storage unit 7 to the printing unit 6b via the memory 6a again, and here outputs the image data by printing in the printing unit 6b.

The storage unit 7 is for storing image data temporarily. That is, as described above, the storage unit 7 stores the image data of a print job received from the original reading unit 2 and a print job received from an external device such as the terminal 31, 32 or 42, the facsimile 21 or 41, or the like. The storage unit 7 can be configured as a storage means provided with a magnetic storage medium. Therefore, even when reading of an original of multiple sheets is carried out at once in the original reading unit 2 or even when print jobs are introduced simultaneously from the plurality of external devices via the communication connection means such as the network 30 and the like, since information such as image data is temporarily stored in the storage unit 7, these print jobs can be processed efficiently.

The management unit 8 has a memory that stores the login information of a plurality of users. The management unit 8 stores in the memory, for example, processing information such as the control information and setup information for the digital multifunction machine 1 in addition to the login information, and the management unit 8 can also manage the processing information. An example of the processing information is information about each function of the digital multifunction machine 1, e.g., information for the control of the operation of each function, information for the adjustment between each function, information for the control of the entire operation of the digital multifunction machine 1, or like control information. Moreover, the management unit 8 can store and manage not only the information for the control of the operation of each function but also the information used in each function.

The digital multifunction machine 1 is further provided with an erasing means 9 that erases the image data stored in the storage unit 7, a feed tray unit 50 that feeds a recording material to the printing unit 6b, and a discharge tray unit 60 that discharges as a print the recording material printed in the printing unit 6b.

The erasing means 9 erases the image data information temporarily stored in the storage unit 7 after a predetermined hold time has passed. Thereby, the digital multifunction machine 1 is configured to be able to erase by the erasing means 9 the image data temporarily stored in the storage unit 7 for performing copying, printing, facsimile transmission, etc., when a predetermined hold time has passed. With this configuration, a free space can be stably secured in the storage unit 7 and new information can be stored favorably.

The feed tray unit 50 here is equipped with a first feed tray 11, a second feed tray 12 and a manual feed tray 13. The discharge tray unit 60 is equipped with a single discharge tray 14. Specifically, the first feed tray 11 and the second feed tray 12 are both removably attached to the body of the digital multifunction machine 1. The digital multifunction machine 1, when performing printing, transports a recording material picked up by a roller from the first feed tray 11 or the second feed tray 12 to the printing unit 6b, performs image formation (printing) in the printing unit 6b, and discharges the recording material as a print P onto the single discharge tray 14 when the digital multifunction machine 1 performs printing. Moreover, the manual feed tray 13 is for manually feeding a recording material. With respect to the digital multifunction machine 1 of this embodiment, an example was given in which the first feed tray 11, the second feed tray 12 and the manual feed tray 13 are provided in the feed tray unit 50. It is, however, sufficient that there is at least one feed tray.

[Image Processing Modes of Digital Multifunction Machine]

Next, examples of operations with respect to image processing modes provided in the digital multifunction machine 1 shall be described.

(Copier Mode)

The copier mode is a mode when the digital multifunction machine 1 according to the embodiment of the present invention functions as a copier. When the digital multifunction machine 1 is operated as a copier, an image of an original is read by the imaging device 2a of the original reading unit 2. The read image data of the original image is stored in the memory 6a and further forwarded to and temporarily stored in the storage unit 7 by the page. When there are a plurality of originals, these reading and storing operations are repeated. Then, the image data is processed according to the processing mode (settings such as printing conditions) instructed from the operation unit 4, and sent from the storage unit 7 to the memory 6a in sequence at a suitable time. The image data is forwarded from the memory 6a to the printing unit 6b to match the time of writing onto an image carrier in the printing unit 6b and printed here on a recording material based on the image data. The recording material printed in the printing unit 6b is discharged as print P on to the discharge tray 14.

Moreover, when the read image data is printed on a plurality of sheets of a recording material, the aforementioned processing is repeated in the same manner as above for the same number of times as there are sheets on which the image is output.

(Printer Mode)

The printer mode is a mode when the digital multifunction machine 1 according to the embodiment of the present invention functions as a printer. When the digital multifunction machine 1 is operated as a printer, the digital multifunction machine 1 receives via the communication unit 5 the image data of a print job sent from an external device such as the terminal 31, 32 or the like connected to the communication connection means such as the network 30. The received image data is forwarded to the storage unit 7 via the memory 6a and temporarily stored in the storage unit 7. Then, when printing is performed, the image data is forwarded to the printing unit 6b from the storage unit 7 via the memory 6a again to match the time of writing in the printing unit 6b, and here printing on a recording material based on the image data is performed.

(Scanner Mode)

The scanner mode is a mode when the digital multifunction machine 1 according to the embodiment of the present invention functions as a scanner. When the digital multifunction machine 1 is operated as a scanner, an image of an original is read by the imaging device 2a of the original reading unit 2. The read image data of the original can be sent from the communication unit 5 to any external device such as the terminal 31 or 32 or the like via the communication connection means such as the network 30 or the like.

Specifically, the read image data of the original is forwarded to the storage unit 7 via the memory 6a and temporarily stored in the storage unit 7. After a communication with a destination instructed through the operation unit 4 is established, the image data stored in the storage unit 7 is sent through the communication unit 5 to the designated destination via the memory 6a again.

(Facsimile Mode)

The facsimile mode is a mode when the digital multifunction machine 1 according to the embodiment of the present invention functions as a facsimile. When the digital multifunction machine 1 is operated as a facsimile, in facsimile transmission, an image of an original is read by the imaging device 2a of the original reading unit 2. Then, the read image data of the original is sent from the communication unit 5 to an external device such as the internet facsimile 41 or the like via the communication connection means such as the network 30, the internet 40, etc., or the read image data is sent from the FAX modem 10 of the communication unit 5 to an external device such as the facsimile 21 or the like via the communication connection means such as the telephone network 20 or the like. On the other hand, in facsimile reception, the image data of a print job (facsimile job) sent from an external device such as the facsimile 21 or 41 or the like connected to the communication connection means such as the telephone network 20, the network 30, the internet 40, etc., is received via the communication unit 5. The received image data is forwarded to the storage unit 7 via the memory 6a and is temporarily stored in the storage unit 7. When printing is performed, the image data is forwarded to the printing unit 6b from the storage unit 7 via the memory 6a again to match the time of writing in the printing unit 6b, and here printing on a recording material based on the image data is performed.

[Control by Device Control Unit]

Next, an example of control by the device control unit 3 shall be described. In the digital multifunction machine 1, the device control unit 3 is configured to include a login recognition means that recognizes a state of a user being logged in the management unit 8; a job recognition means that recognizes whether or not a print job is introduced from one or a plurality of the external devices; a suspending means that, when the introduction of a print job from the one or a plurality of the external devices is recognized by the job recognition means while the login state is recognized by the login recognition means, suspends the print job by storing temporarily the image data of the print job received from the one or a plurality of the external devices in the storage unit 7; and a print starting means that, when the login recognition means detects a logout with the termination of the login state in the login management unit 8, cancels the suspension by the suspending means of the print job received from the one or a plurality of the external devices and starts printing based on the image data of the print job that is received from the one or a plurality of the external devices that is stored in the storage unit 7.

(Description of Operation Flow for Print Job by Digital Multifunction Machine)

Figure 3:
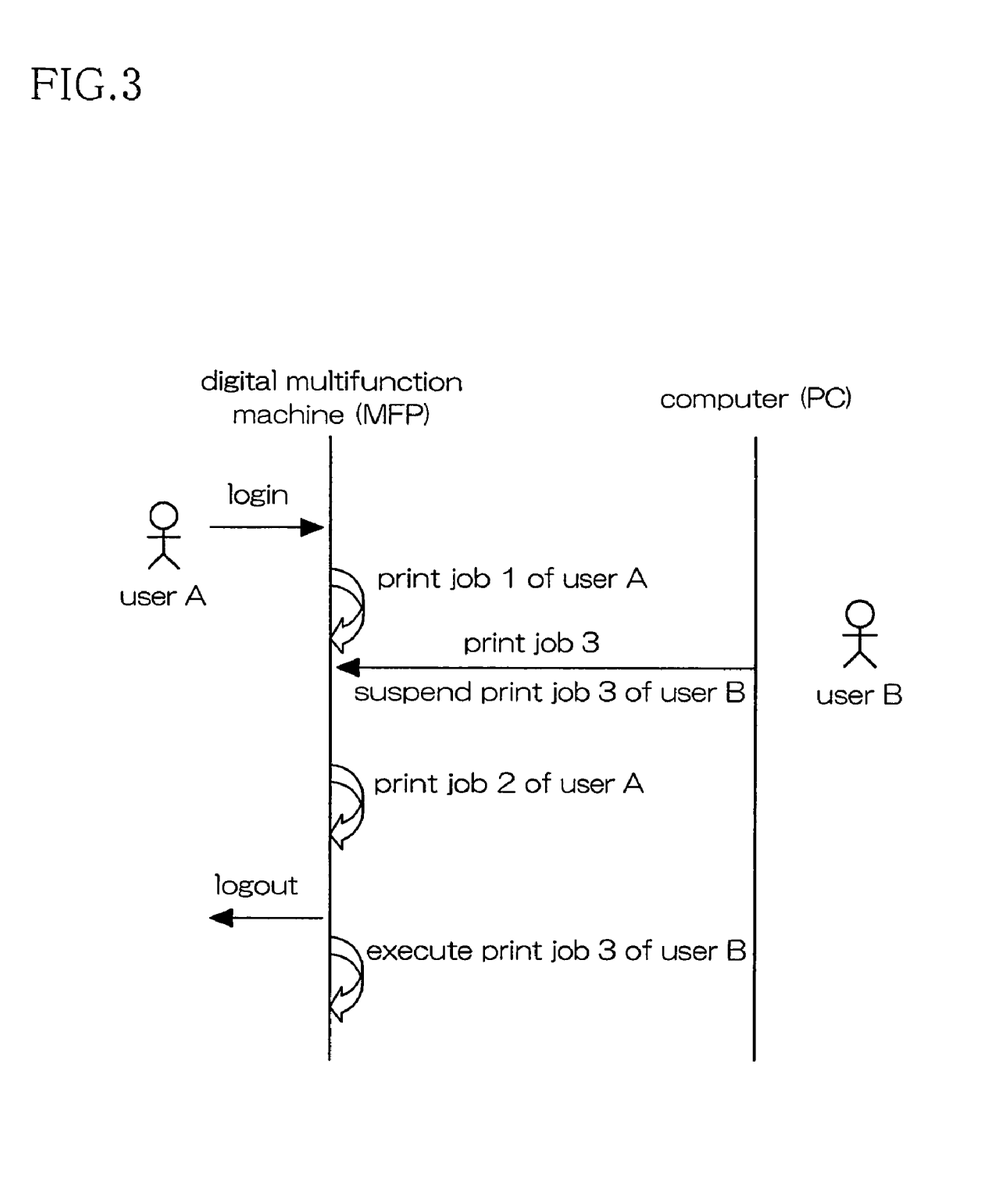
FIG. 3 is an explanatory drawing showing a state in which when one user is logged in to the digital multifunction machine shown in FIG. 1, if a print job of another user is introduced from an external device, the print job of the user who introduced the print job is suspended.
Figure 4A:
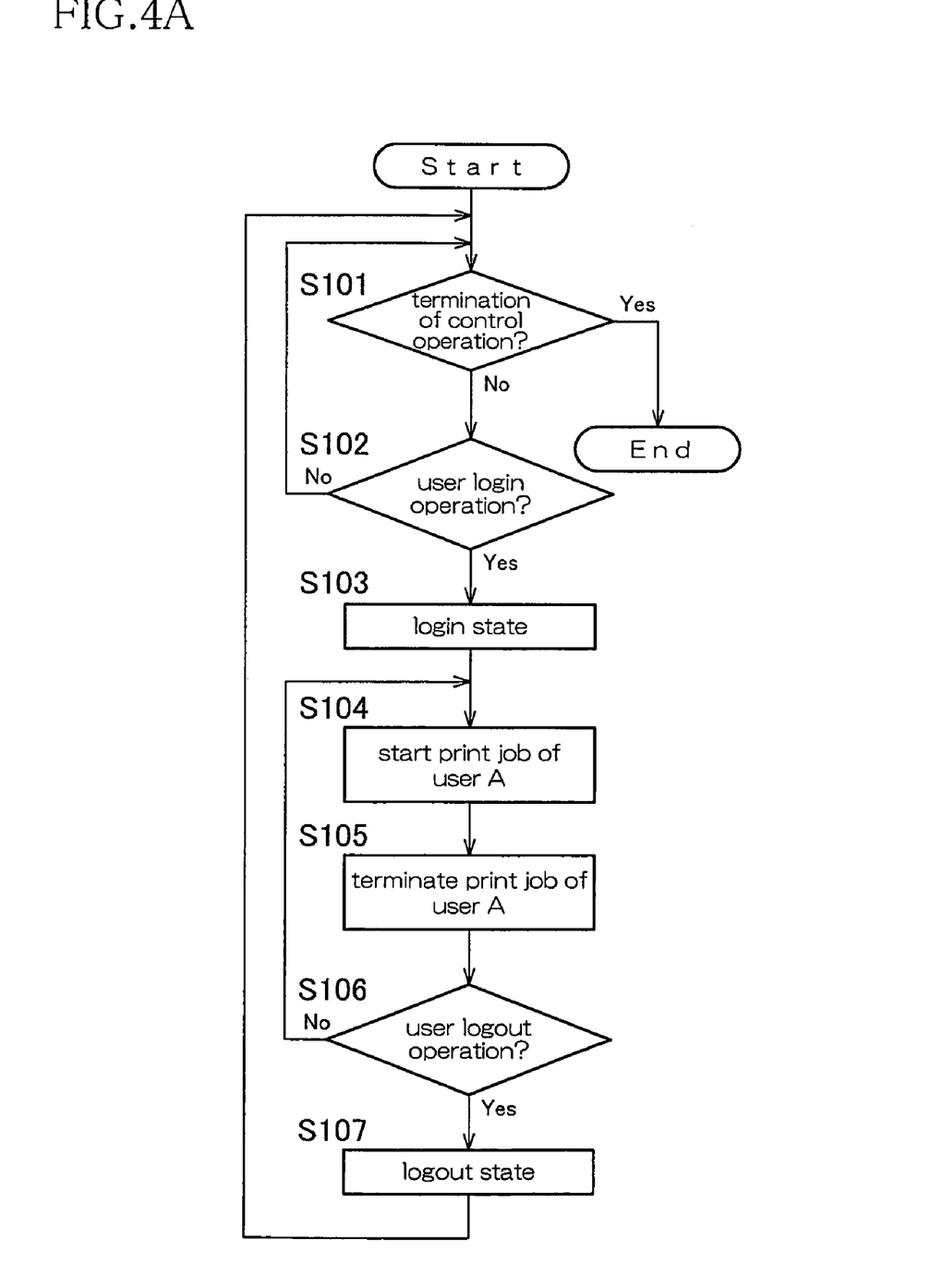
FIG. 4A is a flow chart showing an example of an operation flow for the print jobs shown in FIG. 3 by the digital multifunction machine shown in FIG. 1, and shows an operation flow for a print job of the digital multifunction machine itself.
Figure 4B:
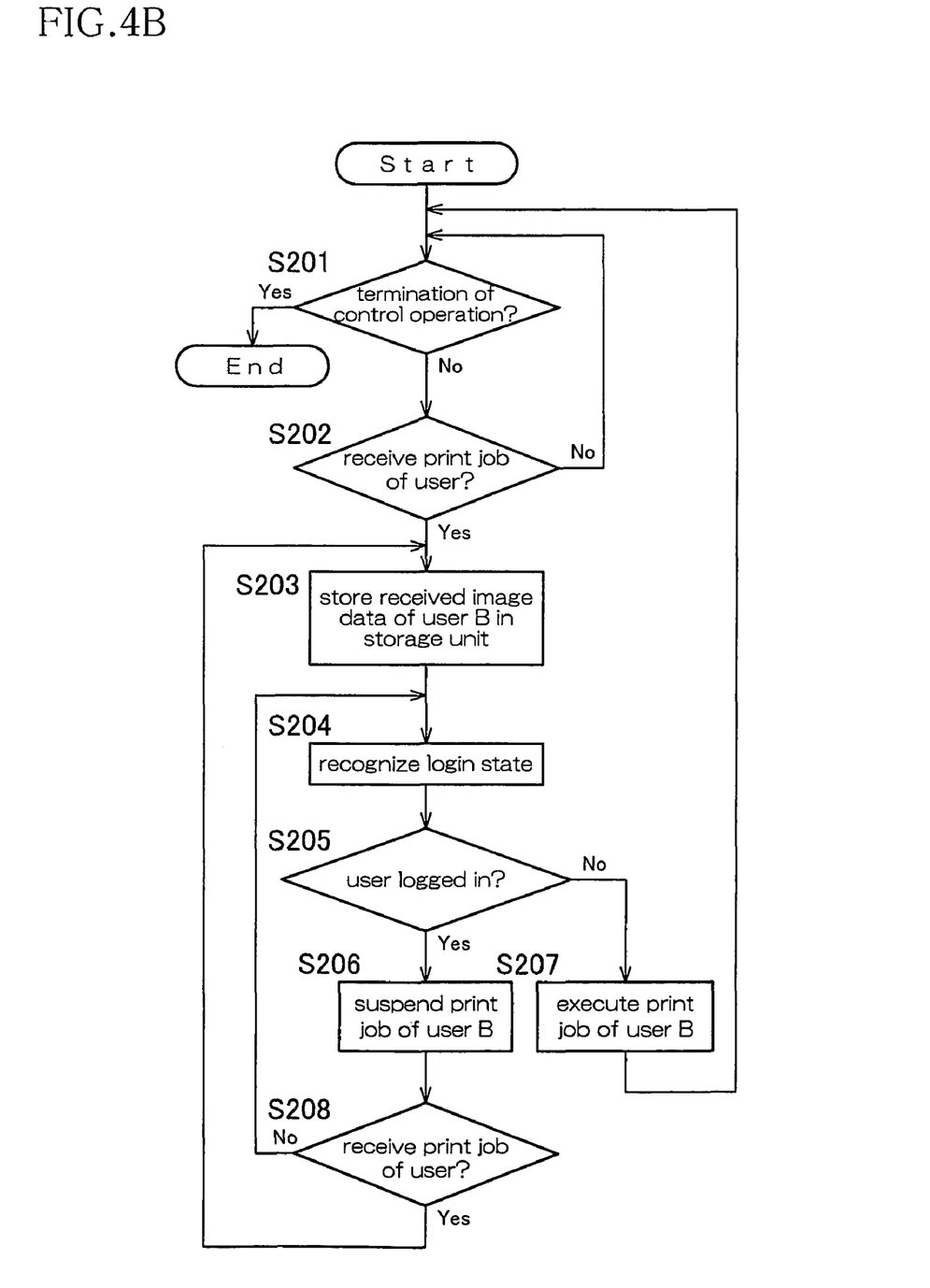
FIG. 4B is a flow chart showing an example of an operation flow for the print jobs shown in FIG. 3 by the digital multifunction machine shown in FIG. 1, and shows a flow of an operation executed by a digital multifunction machine for a print job received from an external device.

Next, an example of an operation flow for a print job by the digital multifunction machine 1 is described. FIG. 3 is an explanatory drawing showing a state in which when user A is logged in to the digital multifunction machine 1 shown in FIG. 1, if a print job of another user B is introduced from an external device, the print job of user B who has introduced the print job is suspended. FIG. 4A and FIG. 4B are flow charts showing examples of operation flows by the digital multifunction machine 1 shown in FIG. 1 for the print jobs shown in FIG. 3 in which FIG. 4A shows a flow of an operation for a print job of the digital multifunction machine 1, and FIG. 4B shows a flow of an operation executed by the digital multifunction machine 1 for a print job received from an external device. The digital multifunction machine 1 is configured to concurrently process the print job of the digital multifunction machine 1 itself shown in FIG. 4A and the print job received from an external device shown in FIG. 4B. In the description given below, a computer 31 that introduces a print job is described as an example of the external device that introduces the print job.

As shown in FIG. 3, in the digital multifunction machine 1, a login operation is first given by user A. Then, print job 1 (here a copy operation) is started by user A, and this print job 1 is then terminated.

Specifically, the digital multifunction machine 1 is powered on and stays on standby until a user performs an operation to log in to the digital multifunction machine 1 as shown in FIG. 4A (steps S101-S102). When user A operates the input unit 4a in the operation unit 4 and is logged in (step S102: Yes), a login state is attained (step S103). User A then starts a copy operation for print job 1 (step S104), and then this copy operation is terminated (step S105).

As shown in FIG. 3, while user A prepares for the next copy operation after the termination of the copying of print job 1 by user A, a print job of print job 3 is introduced from at least one external device such as the terminal 31, 32 or 42, the facsimile apparatus 21 or 41, or the like (here computer 31) by user B. In this case, the image data of print job 3 thus introduced is temporarily stored in the storage unit 7. Since user A is logged in at this time, print job 3 of user B is in the suspended state.

Specifically, as shown in FIG. 4B, in the digital multifunction machine 1, a judgment is made of whether or not a print job of a user has been introduced from an external device (steps S201-S202); and when it is determined that a print job from an external device (here, print job 3 of the external computer 31) has been introduced (step S202: Yes), the image data of print job 3 of user B received from the external computer 31 is stored in the storage unit 7 (step S203). Then, a login state to the digital multifunction machine 1 is recognized (step S204), and it is judged whether or not there is a user who is logged in (step S205). Since user A is logged in at this time, when user A is determined as being logged in (step S205: Yes), print job 3 of user B is brought to a suspended state (step S206), and the procedure advances to step S208 where it is further judged whether or not a print job of another user has been introduced. Until a print job of another user is further introduced from an external device (step S208: No), the procedure advances to step 204 and the processing of steps S204-S208 is repeated. On the other hand, in step S208, when a print job of another user is further introduced from an external device (step S208: Yes), the procedure advances to step 203 and the image data of the print job of the user that is received from an external device is stored in the storage unit 7.

As shown in FIG. 3, the copy operation for the next print job 2 by user A is then performed. After the termination of the copy operation for print job 2, the print created according to copy job 2 of user A is placed over the print that is created according to the copy job 1 of the same user A and that has been discharged in advance on the discharge tray 13. Then, an operation to log out of the digital multifunction machine 1 is performed by user A. When the logout operation of user A is recognized, the print created according to print job 3 of user B that has been in the state of being suspended is discharged on the discharge tray 13. As a result, the print created according to print job 3 of user B is placed over the prints created according to copy jobs 1 and 2 of user A, so it is possible to prevent the prints created according to copy jobs 1 and 2 of user A and the print created according to print job 3 of user B from being in a mixed state while the user A is logged in. It is therefore possible to eliminate the time and effort of subsequent sorting work that is performed manually.

Specifically, as shown in FIG. 4A, in the digital multifunction machine 1, it is detected whether or not the user is logged out (step S106), and when the user is not logged out (step S106: No), the procedure advances to step S104, and in contrast, when the user is logged out (step S106: Yes), a logout state is attained (step S107) and the procedure advances to step S101. Then, as shown in FIG. 4B, when a login state is recognized (step S204) and there is no user who is logged in (step S205: No), print job 3 of user B that has been in the state of being suspended, or other print jobs that have been in the state of being suspended, are printed (step S207), and the procedure advances step S201.

As shown in step S101 of FIG. 4A and step S201 of FIG. 4B, the operation flow for the print jobs is terminated by the termination of the entire control operation of the digital multifunction machine 1.

In step S205 of FIG. 4B, when there is a user who is logged in, print job 3 of user B is suspended as described above, and when there is no user who is logged in, printing of print job 3 is started immediately.

As described above, in the digital multifunction machine 1 according to the embodiment of the present invention, when a print job is introduced from at least one of the external devices such as the terminals 31, 32 and 42, the facsimiles 21 and 41, and the like while a state of a user being logged in to the digital multifunction machine 1 is recognized, the image data of the print job from the external device(s) from which the print data is introduced is temporarily stored in the storage unit 7, and the print job stored in the storage unit 7 is initiated when a logout is accomplished after the login state is terminated. Therefore, while the user is logged in, for example, even when a copy operation is performed and print jobs of other users from the external devices 31, 32, 41, 42 and 21 are executed, it is possible to prevent print P produced while the user is logged in from being mixed with the prints of the other users.

Other Embodiments

In this embodiment, the storage unit 7 is a storage device (hard disk drive (HDD)) built in the digital multifunction machine 1. It may, however, be an external storage device such as a USB memory connected to the digital multifunction machine 1.

Moreover, in this embodiment, the management unit 8 may be configured such that the authentication information of a plurality of users can be registered therein, and the device control unit 3 may be configured to have a user authentication function with which the login information of the plurality of users collected by the management unit 8 is used in the authentication management of the authentication information of the users registered in the management unit 8.

Figure 5:
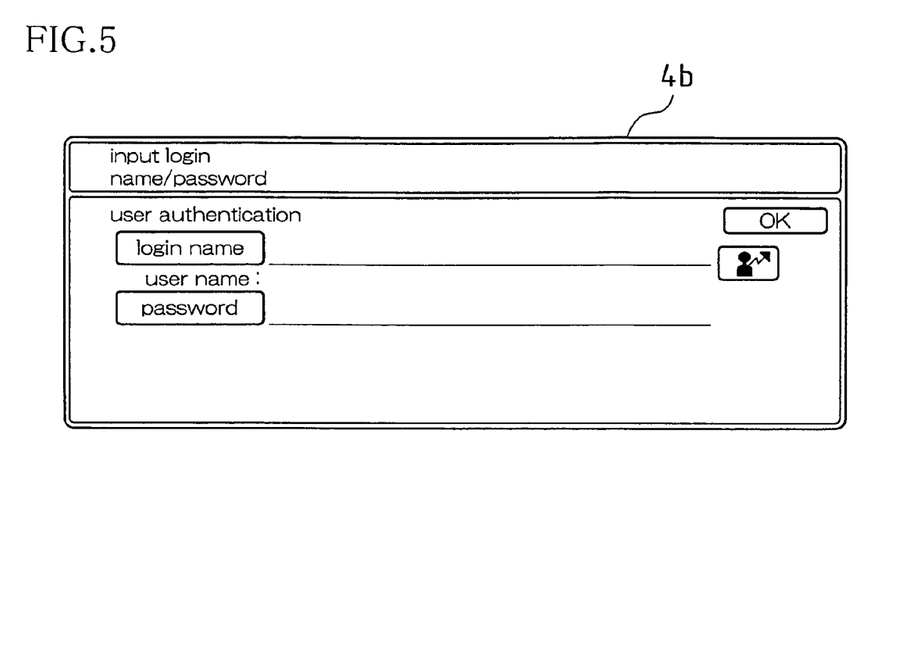
FIG. 5 is a drawing showing a login screen on the display unit of the digital multifunction machine shown in FIG. 1.

FIG. 5 is a drawing showing a login screen on the display unit 4b of the digital multifunction machine 1 shown in FIG. 1.

In this embodiment, when the user authentication function is provided, once the user authentication function is activated in the operation unit 4 shown in FIG. 1, this information is stored in the management unit 8, thereby activating the authentication function, and an image as shown in FIG. 5 is displayed on the display unit 4b in the operation unit 4.

The user authentication is carried out in the device control unit 3. That is, the user authentication is realized by comparing the authentication information (a user name and a password in an example shown in the drawing) input by the user through the input unit 4a in the operation unit 4 with the authentication information of the user stored in the management unit 8 of the digital multifunction machine 1. An authentication server may be provided external to the digital multifunction machine 1. In this case, the authentication information input by the user can be approved by the external authentication server.

In order to manage the users who use the digital multifunction machine 1, an authentication information input means from which the identification information of the users is input may be provided in the input unit 4a. Examples of this authentication information input means include a direct input means for use with a user code, an input means for reading information provided in ID cards, an input means for reading biometric information such as users' fingerprints, etc.

Logging-out can be realized by, for example, a key input at the input unit 4a (specifically, by inputting a specific key word). The digital multifunction machine 1 is configured to perform processing to display the authentication screen shown in FIG. 5 when logging-out takes place.

In this embodiment, a coin-operated vending machine 90 may be connected to the digital multifunction machine 1 as shown in FIG. 1. In this case, an example of the user login and logout processing in the management unit 8 can be the cash-in and cash-out processing by the coin-operated vending machine 90, respectively. For example, when the coin-operated vending machine 90 is used for self-service by general customers and the digital multifunction machine 1 is used for clerical work by store employees, it can be determined whether or not a customer is using the digital multifunction machine 1 based on the cash-in/cash-out condition of the coin-operated vending machine 90.

Figure 6:
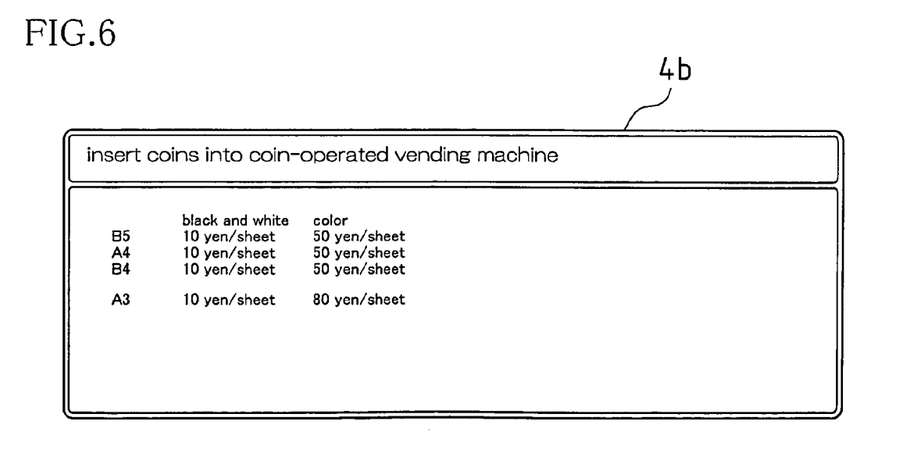
FIG. 6 is a drawing showing a login screen on the display unit of the digital multifunction machine shown in FIG. 1 when a coin-operated vending machine is connected.

FIG. 6 is a drawing showing a login screen on the display unit 4b of the digital multifunction machine 1 shown in FIG. 1 when a coin-operated vending machine 90 is connected to the digital multifunction machine 1.

When the cash-in and cash-out processing of the coin-operated vending machine 90 is used as the user login and logout processing, if a coin is inserted into the coin-operated vending machine 90, this information is sent to the device control unit 3 of the digital multifunction machine 1, making the digital multifunction machine 1 operational. The information that a user is using the digital multifunction machine 1 by inserting a coin into the coin-operated vending machine 90 is managed by the management unit 8 of the digital multifunction machine 1. Moreover, when the digital multifunction machine 1 performs all the print jobs for the amount of money inserted into the coin-operated vending machine 90, or when a means for performing a coin-return operation that is provided in the coin-operated vending machine 90 is used, the image provided on the display unit 4b of the digital multifunction machine 1 is replaced by the one shown in FIG. 6.

In this embodiment, it is preferable that the device control unit 3 is provided with a setting means that sets a time from the detection of a logout with the termination of the state of a user being logged in to the digital multifunction machine 1 in the management unit 8 until the start of printing based on the image data of a print job that is received from an external device and stored in the storage unit 7. By adopting this configuration, it is possible to avoid the problem that when a print job (suspended job) received from an external device into which the print job was introduced is immediately executed after a logout with the termination of the state of a user being logged in to the digital multifunction machine 1, a user who previously used the digital multifunction machine 1 (user who was logged in until then) takes away a print by accident.

On the other hand, the user who has introduced a print job from an external device thinks that the print job is executed immediately and the user goes to the digital multifunction machine 1 to pick up the print printed according to the print job thus executed, but if the introduced print job is suspended, the job is not executed immediately. Therefore, it is preferable to inform the user who has introduced the print job that the print job is in the suspended state. Thus, in this embodiment, it is preferable that the device control unit 3 is configured to have an informing means that, when the image data of a print job (suspended job) received from an external device into which the print job was introduced is stored in the storage unit 7 while the state of a user being logged in to the digital multifunction machine 1 is recognized by the management unit 8, informs the external device that the image data of the print job received from the external device is temporarily stored in the storage unit 7 without being printed, i.e., the print job of the external device is suspended. With this configuration, it is possible to inform the user who has introduced the print job that the print job is suspended and the print job is not immediately printed. Thus, by informing the user who has introduced the print job that the print job is pending, a meaningless effort, such as looking for a print, due to the fact that his own print is not found on the digital multifunction machine 1 can be prevented.

Furthermore, in this embodiment, the discharge tray unit 60 may be provided with a plurality of discharge trays in place of the single discharge tray 14. In this case, the device control unit 3 can be configured such that after the device control unit 3 detects a logout with the termination of the state of a user being logged in to the digital multifunction machine 1 by the login recognition means in the management unit 8, the device control unit 3 uses a discharge tray that is a discharge destination of print P printed based on the image data of the print job received from an external device and stored in the storage unit 7 and that is different from the discharge tray used during the login state. That is, the device control unit 3 can be configured such that after the device control unit 3 detects a logout with the termination of the state of a user being logged in by the login recognition means in the management unit 8, the device control unit 8 discharges a recording material on which an image is formed based on the image data of a print job received from an external device and stored in the storage unit 7 onto a discharge tray that is different from that used during the login state.

In addition, when the discharge unit is provided with a plurality of discharge trays, the device control unit 3 can be configured such that after detecting a logout with the termination of the state of a user being logged in by the login recognition means in the management unit 8, when the image data received from the external device and stored in the storage unit 7 is of a plurality of print jobs, the device control unit 3 uses different discharge trays for each job on which the recording materials on which images are formed based on the image data of the plurality of print jobs are discharged. For example, the device control unit 3 can be configured such that after detecting a logout with the termination of the state of a user being logged in to the digital multifunction machine 1 by the login recognition means in the management unit 8, when the image data received from an external device and stored in the storage unit 7 is of a plurality of print jobs and when the number of the plurality of print jobs is smaller than the number of the plurality of discharge trays, the device control unit 3 uses discharge trays all different for each job as destination discharge trays on which prints P printed based on the image data of the plurality of print jobs is discharged.

In this embodiment, described was an example of when, in the digital multifunction machine 1, a print job is introduced from an external device while the state of a user being logged in to the digital multifunction machine 1 is recognized in the management unit 8. However, in a case where the state of a user being logged in to one external device among a plurality of external devices is recognized in the management unit 8, when a print job is introduced from one or a plurality of the other external devices, the print data of the print job received from the one or a plurality of other external devices is temporarily stored in the storage unit 7, and when a logout with the termination of the state of the user being logged in to the first external device is detected in the management unit 8, printing may be started based on the print data of the print job that is received from the one or a plurality of other external devices and stored in the storage unit 7. In addition, in this embodiment, the digital multifunction machine 1 that reads an image of an original as print data, i.e., that has an image reading function was used as an image forming apparatus according to the present invention. However, the present invention is not limited thereto, and may be an image forming apparatus that does not have any image reading function, such as a printer.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus to which a user can login, the image forming apparatus having a communication function to communicate with an external device and an image recording function to perform printing based on print data, the image forming apparatus comprising:
    a login management unit that manages login information of a user,
    a storage unit that stores print data of a print job received from the external device, and
    a control unit,
    wherein when a print job is introduced from the external device while the control unit recognizes a state of a user being logged in the login management unit, the control unit temporarily stores the print data of the print job received from the external device in the storage unit and then when the control unit detects a logout with termination of the login state in the login management unit, the control unit starts printing of the print job received from the external device stored in the storage unit; and
    the control unit can set a time from the detection of the logout with the termination of the login state in the login management unit until the start of printing of the print job received from the external device stored in the storage unit.

2. The image forming apparatus according to claim 1, wherein the storage unit is a storage device built in the image forming apparatus or an external storage device that is connected to the exterior of the image forming apparatus.

3. The image forming apparatus according to claim 1, wherein the login management unit is configured such that authentication information of a user can be registered in the login management unit, and management of login information of the user by the login management unit is realized by an authentication function using the registered authentication information of the user.

4. The image forming apparatus according to claim 1, wherein a coin-operated vending machine is connected to the image forming apparatus, and
    user login and logout processing in the login management unit is cash-in and cash-out processing by the coin-operated vending machine, respectively.

5. The image forming apparatus according to claim 1, wherein the control unit comprises an informing means that informs the external device that the print job of the external device is suspended when the print data of the print job received form the external device is stored in the storage unit while the login state in the login management unit is recognized.

6. The image forming apparatus according to claim 1, further comprising a plurality of discharge trays,
    wherein after detecting the logout with the termination of the login state in the login management unit, the control unit uses a discharge tray that is a destination discharge tray for a print printed according to the print job received from the external device and stored in the storage unit and that is different from a discharge tray used during the login state.

7. The image forming apparatus according to claim 1, further comprising a plurality of discharge trays,
    wherein after detecting the logout with the termination of the login state in the login management unit, when the print data received from the external device and stored in the storage unit is of a plurality of print jobs, the control unit uses different discharge trays for each job as destination discharge trays on which prints printed according to the plurality of print jobs are discharged.

8. The image forming apparatus according to claim 1, having an image reading function to read an image of an original as print data, wherein the image recording function performs printing based on print data of print jobs from the image reading function and the external device, and when a print job is introduced from the external device while the control unit recognizes a state of a user being logged in to the image forming apparatus in the login management unit, the control unit temporarily stores the print data of the print job received from the external device in the storage unit and then when the control unit detects a logout with termination of the state of the user being logged in to the image forming apparatus in the login management unit, the control unit starts printing of the print job received from the external device stored in the storage unit.

9. The image forming apparatus according to claim 8, wherein the storage unit is a storage device built in the image forming apparatus or an external storage device that is connected to the exterior of the image forming apparatus.

10. The image forming apparatus according to claim 8, wherein the login management unit is configured such that authentication information of a user can be registered in the login management unit, and management of login information of the user by the login management unit is realized by an authentication function using the registered authentication information of the user.

11. The image forming apparatus according to claim 8, wherein a coin-operated vending machine is connected to the image forming apparatus, and user login and logout processing in the login management unit is cash-in and cash-out processing by the coin-operated vending machine, respectively.

12. The image forming apparatus according to claim 8, wherein the control unit can set a time from the detection of the logout with the termination of the login state in the login management unit until the start of printing of the print job received from the external device stored in the storage unit.

13. The image forming apparatus according to claim 8, wherein the control unit comprises an informing means that informs the external device that the print job of the external device is suspended when the print data of the print job received form the external device is stored in the storage unit while the login state in the login management unit is recognized.

14. The image forming apparatus according to claim 8, further comprising a plurality of discharge trays, wherein after detecting the logout with the termination of the login state in the login management unit, the control unit uses a discharge tray that is a destination discharge tray for a print printed according to the print job received from the external device and stored in the storage unit and that is different from a discharge tray used during the login state.

15. The image forming apparatus according to claim 8, further comprising a plurality of discharge trays, wherein after detecting the logout with the termination of the login state in the login management unit, when the print data received from the external device and stored in the storage unit is of a plurality of print jobs, the control unit uses different discharge trays for each job as destination discharge trays on which prints printed according to the plurality of print jobs are discharged.

* * * * *